(12) United States Patent
Shazeer

(10) Patent No.: US 7,194,684 B1
(45) Date of Patent: Mar. 20, 2007

(54) METHOD OF SPELL-CHECKING SEARCH QUERIES

(75) Inventor: Noam Shazeer, Stanford, CA (US)

(73) Assignee: Google Inc., Mountain View, CA (US)

( * ) Notice: Subject to any disclaimer, the term of this patent is extended or adjusted under 35 U.S.C. 154(b) by 481 days.

(21) Appl. No.: 10/119,375

(22) Filed: Apr. 9, 2002

(51) Int. Cl.
*G06F 15/00* (2006.01)

(52) U.S. Cl. .................. 715/533; 715/532; 715/530; 715/540; 707/3; 707/6

(58) Field of Classification Search ............... 715/533, 715/532, 530, 540; 707/3, 6
See application file for complete search history.

(56) References Cited

U.S. PATENT DOCUMENTS

| | | | | |
|---|---|---|---|---|
| 5,488,377 | A * | 1/1996 | Reynolds et al. | 342/93 |
| 5,765,180 | A * | 6/1998 | Travis | 715/533 |
| 5,907,839 | A | 5/1999 | Roth | |
| 6,014,226 | A * | 1/2000 | Harrington et al. | 358/1.9 |
| 6,076,080 | A * | 6/2000 | Morscheck et al. | 705/400 |
| 6,320,193 | B1 * | 11/2001 | Morrison et al. | 250/393 |
| 6,523,019 | B1 * | 2/2003 | Borthwick | 706/45 |
| 6,601,059 | B1 * | 7/2003 | Fries | 707/3 |
| 2002/0194229 | A1 * | 12/2002 | Decime et al. | 707/533 |
| 2003/0171910 | A1 * | 9/2003 | Abir | 704/1 |
| 2004/0054605 | A1 * | 3/2004 | Whittet | 705/27 |
| 2004/0093567 | A1 * | 5/2004 | Schabes et al. | 715/533 |

* cited by examiner

*Primary Examiner*—Stephen Hong
*Assistant Examiner*—Kristina Honeycutt
(74) *Attorney, Agent, or Firm*—Harrity Snyder, LLP

(57) ABSTRACT

A computer-implemented method for determining whether a target text-string is correctly spelled is provided. The target text-string is compared to a corpus to determine a set of contexts which each include an occurrence of the target text-string. Using heuristics, each context of the set is characterized based on occurrences in the corpus of the target text-string and a reference text-string. Contexts are characterized as including a correct spelling of the target text-string, an incorrect spelling of the reference text-string, or including an indeterminate usage of the target text-string. A likelihood that the target text-string is a misspelling of the reference text-string is computed as a function of the quantity of contexts including a correct spelling of the target text-string and the quantity of contexts including an incorrect spelling of a reference text-string. In one application, the target text-string is received in a search query, the search executed following a spell-check.

32 Claims, 2 Drawing Sheets

METHOD OF SPELL-CHECKING SEARCH QUERIES

FIELD OF THE INVENTION

The present invention generally relates to retrieving information from a data communication network and, more particularly, to techniques for computer-implemented spell checking of search engine query text strings.

BACKGROUND OF THE INVENTION

The World Wide Web (or "Web") contains a vast amount of information in the form of hyperlinked documents (e.g., web pages) loosely-organized and accessed through a data communication network (or "Internet"). One of the reasons for the virtually explosive growth in the number of hyperlinked documents on the Web is that just about anyone can upload hyperlinked documents, which can include links to other hyperlinked documents. The unstructured nature and sheer volume of web pages available via the Internet makes it difficult to efficiently find and navigate through related information while avoiding unrelated information.

One conventional way to cull information on a computer network (e.g., the Internet) is through use of a search engine. A user typically begins a search for relevant information using a search engine. A search engine attempts to return relevant information in response to a request from a user. This request usually comes in the form of a query (e.g., a set of words that are related to a desired topic). Search engines typically return a number of links to web pages, with a brief description of those pages. Because the vast number of pages on the Web, ensuring that the returned pages are relevant to the topic the user had in mind is a central problem in web searching. Possibly the simplest and most prevalent way of searching the web is to search for web pages which have a relation to, or containing, all or many of the words included in the query. Such a method is typically referred to as text-based searching. Text-based searching over the Web can be notoriously imprecise and several problems can arise in the process.

The process of searching the Internet for narrowly-defined relevant information is akin to finding a "needle" of relevant information in a "haystack" of all the possible information available through the data network. The efficiency of the search process is greatly dependant on the quality of the search. Often a large number of web pages match a user's query. Typically, presentation of query results are ranked according to a predefined method or criteria thereby directing a user to what is believed to be the most-relevant information first. Poor quality queries tend to misdirect the search process, interfere with ranking algorithms and generally, produce poorer search results. In the aggregate, inefficient Internet search methods tend to slow the data network, occupying web page servers with request for irrelevant web pages, and clogging data network paths with transmissions of irrelevant web page information.

As the size of the Internet continues to increase, it becomes increasingly more desirable to have innovative techniques for efficiently searching hyperlinked documents.

SUMMARY OF THE INVENTION

The present invention is directed to a computer-implemented method for spell-checking text utilizing heuristics. The present invention is exemplified in a number of implementations and applications, some of which are summarized below.

According to an example embodiment of the present invention, a computer-implemented application includes a method for spelling error detection in a target text-string, such as a word or phrase. The target text-string is compared to a database, or corpus, to determine a set of contexts which each include an occurrences of the target text-string. Each context of the set of contexts is further characterized either including a correct spelling of the target text-string, including an incorrect spelling of a reference text-string (e.g., another word or phrase), or being a context including an indeterminate usage of the target text-string in the context. A likelihood that the target text-string is a misspelling of the reference text-string is thereafter computed as a function of the quantity of contexts including a correct spelling of the target text-string and the quantity of contexts including an incorrect spelling of a reference text-string. In one more particular example implementation of the present invention, a probability that the target text-string is misspelled is computed as a ratio of quantity of contexts including a correct spelling of the target text-string relative to the quantity of non-indeterminate contexts.

According to another general example embodiment of the present invention, a computer-implemented application detects spelling errors in a target text-string, such as a word or phrase. The target text-string is compared to a database of contexts to determine from the comparison, a set of potentially-corresponding contexts; each context in the set having an "occurrence of the target text-string" characterized as either including a correct spelling of the target text-string, an incorrect spelling of a reference text-string, or being an indeterminate context. Using a quantification of each characterization, according to the present invention, the computer application computes a likelihood that the target text-string is misspelled. For example, with X being the quantity of contexts including a correct spelling of the target text-string, Y being the quantity of contexts including an incorrect spelling of a reference text-string, and Z being the quantity of indeterminate contexts, a likelihood that the target text-string is a misspelling of the reference text-string is computed as a function of one of X and Y, relative to X plus Y. In more typical implementations of the present invention, each of X, Y and Z is a positive integer. In another implementation, the computation of likelihood does not include Z.

According to other aspects of the present invention, heuristics are applied to characterize contexts, the heuristics being a function of the occurrences of the target text-string and the reference text-string in the context. Contexts are characterized as including an incorrect spelling of the reference text-string if occurrences of the reference text-string in the context are equal to or greater than a pre-determined minimum quantity threshold (e.g., 1), and a ratio of reference text-string occurrences in the context to target text-string occurrences in the context is also equal to or greater than a pre-determined ratio threshold. Contexts are characterized as including a correct spelling of the target text-string if occurrences of the target text-string in the context are equal to or greater than a second pre-determined quantity threshold (e.g., 1), and a ratio of target text-string occurrences in the context to reference text-string occurrences in the context is also equal to or greater than a second pre-determined ratio threshold. Contexts not characterizable as either correctly spelled or misspellings are indeterminate.

According to a further example embodiment of the present invention, a computer-implemented search engine application detects spelling errors in a target text-string included within a received search query.

In another example embodiment of the present invention, a method is provided for detecting spelling errors in a target text-string by selecting a reference text-string having characteristics corresponding to the target text-string, computing a first ratio of occurrences of the reference text-string relative occurrences of the target text-string in a first database, computing a second ratio of occurrences of the reference text-string relative to occurrences of the target text-string in a second database, and determining a likelihood that the target text-string is misspelled as a function of the first ratio relative to the second ratio. The first and second databases are each a corpus including naturally occurring text that are similar in patterns of content to each other and the text being examined. However, the second database includes fewer spelling errors than the first database.

According to another example embodiment of the present invention, a target text-string is compared to a database, or corpus, to determine a set of contexts, each of which includes an occurrence of the target text-string. Each context of the set of contexts is further characterized, by first using the corpus and then using a better-spelled corpus, as either including a correct spelling of the target text-string, including an incorrect spelling of a reference text-string (e.g., another word or phrase), or being a context including an indeterminate usage of the target text-string in the context. A computation is made of a first ratio of occurrences of the reference text-string relative occurrences of the target text-string in the first database. A second ratio is computed of occurrences of the reference text-string relative to occurrences of the target text-string in the second database. Using this computation, the embodiment provides a likelihood that the target text-string is misspelled is determined as a function of the first ratio and the second ratio. According to a further aspect, the target text-string is received as a portion of a search query for a computer-implemented data network search engine.

According to another example embodiment of the present invention, web page information is controlled in response to a user query identifying a first target web page. Each text-string of the user query is spell-checked. The resulting correctly-spelled search query identifies a second target web page. A database is searched to determine whether the second target web page corresponds to at least one destination web page. In response to the second target web page corresponding to said at least one destination web page, link information is presented for the user to access the destination web pages, along with peripheral information relevant for evaluating the link.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

DETAILED DESCRIPTION

Figure 1:
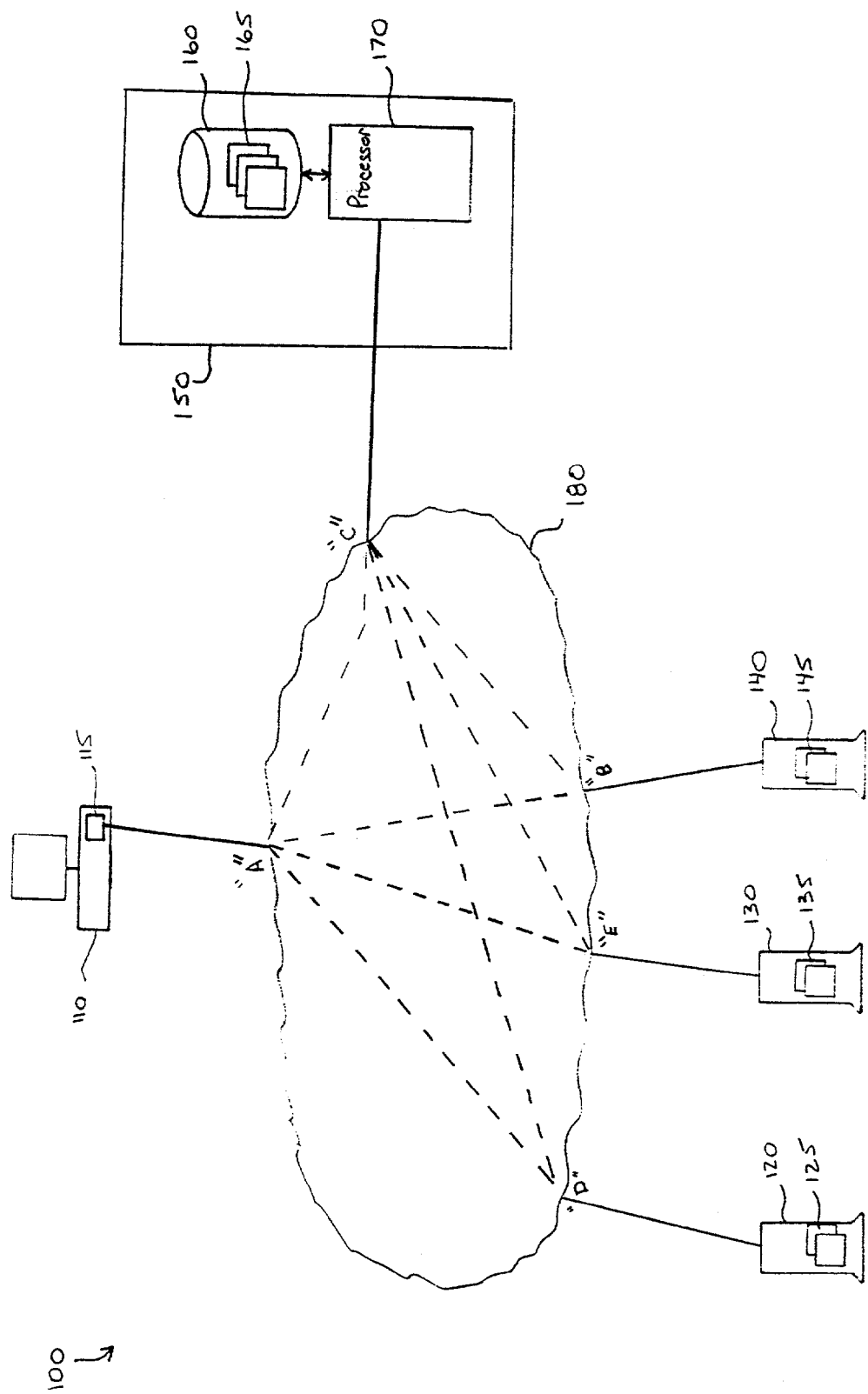
FIG. 1 illustrates a system block diagram of an example embodiment of a data network arrangement, according to the present invention.

The present invention is believed to be applicable to various types of text pattern recognition methods, including computer-implemented spell-checking applications within word processing, speech recognition/transcription, and text-manipulation programs. The present invention has been found particularly suited to computer-implemented information searching and retrieval applications, such as data network search engine applications, for example. While the present invention is not necessarily limited to such search engine spell-checking applications, various aspects of the invention may be appreciated through a discussion of various examples using this context.

A great deal of digital information is communicated to humans via written text displayed on a monitor coupled to a digital processor. Computer-implemented spell checking routines are therefore increasingly more desirable as a means to identify potential text spelling errors. Words are the building blocks of written and spoken language by which ideas are conveyed. Letters of the alphabet comprise a pre-defined set of characters used as phonetic symbols. Particular arrangements of letters are recognized as words by some accepted authority, one or more meanings (e.g., the idea) being associated with the arrangement of letters. Particular letters, along with their particular order within a string of text, are important features by which words of different meaning are distinguished from one another. Typically, the authority tabulates recognized words and their associated meaning(s), for example a dictionary publisher.

Like-sounding words can have different spellings, and different meanings. In the English language, a context within which a particular word is used can influence the pronunciation and/or meaning of the word. Language includes a set of rules supporting common understanding of word usage, for example grammar. The rules may be formal, or very informal, slang being an example of the later for example. In the English language, words are delineated in written text by spaces, and in spoken text by pauses between words. Context of a particular word (e.g., a target word) is the word(s) adjacent to, or nearby, the target word.

Spelling errors in text-strings occur due to a number of reasons. A string of letters (or text-string), delineated as a word, which is not included in a tabulation of recognized words (e.g., "silber" instead of "silver"), is a candidate for being a misspelling of another word. However, the unrecognized text string may constitute a new word not yet included in the tabulation of recognized words as having an associated meaning, or may be a proper name identifying of a particular individual, place or thing. Often an unrecognized text string is very similar to a recognized word, for example a word having one or more additional letters, omitted letters, transposed letters, or substituted letters. A typing error, where a user depresses an incorrect key, is one example of a spelling error due to a substituted letter appearing in a word.

The English language includes phonetically-similar words having similar pronunciations, but different spellings (e.g., blue and blew). Occasionally, a phonetically-identical word is used intentionally, but incorrectly, in a particular context in place of a word having the intended meaning. Incorrect usage of correctly-spelled words is considered another form of spelling error. The "misspelled" word exists in a tabulation of recognized words, and therefore is only detectable from the context of the word's usage, the meaning of the "misspelled" word being inconsistent with the meaning conveyed by the words around the "misspelled" word. With the growth of digitally-formatted information due to an increased usage of computer-implemented processes, ideas are increasingly transcribed into written form (e.g., words) as an intermediate step before digitization for communication and/or storage.

Text-string spelling errors are one factor contributing to a poor quality information search query, and consequently, to poor quality search query results. Spelling errors include misspelled words and the incorrect usage of correctly spelled words. For example, a user wishing to search a computer-implemented data network, such as the Internet, for little red wagons ideally executes a search on the query "little red wagons" via a search engine application. However, the user may erroneously enter the query "little rwd wagons" into a search engine. Obviously, "rwd" is a misspelling of the intended word "red." The spelling error is most likely attributable to a typographical error due to the proximity of the "w" key to the "e" key on a computer keypad used to input the query. The misspelled word is not recognizable as a word, and a conventional search engine will typically produce results including an attempt to locate web pages relevant to the query text string "rwd." The search is further misdirected since the search engine does not attempt to locate web pages relevant to the intended word, "red."

Search query spelling errors attributable to incorrect usage of correctly spelled words are illustrated for example by a search query of "little bed wagons," or even the phonetically-correct "little read wagons." Each of the aforementioned queries include correctly-spelled words that are incorrectly used. It follows that the word located between "little" and "wagons" is not spelled correctly to achieve a correct meaning of the group of words. The error in the search query is undetectable from a simple determination of whether each query text-string is a word, for example, recognized as being a word by being included in a list or look-up table of recognized words. The errors are detectable by considering each text-string (e.g., word or phrase) in a context within which the text-string is used words relative to established rules for using words within the language.

In one general example embodiment of the present invention, a computer-implemented application detects spelling errors in a target text-string, such as a word or phrase. The target text-string is compared to a database, or corpus, to determine a set of contexts which each include an occurrences of the target text-string. Each context of the set of contexts is further characterized either including a correct spelling of the target text-string, including an incorrect spelling of a reference text-string (e.g., another word or phrase), or being a context including an indeterminate usage of the target text-string in the context. A likelihood that the target text-string is a misspelling of the reference text-string thereafter computed as a function of the quantity of contexts including a correct spelling of the target text-string and the quantity of contexts including an incorrect spelling of a reference text-string. In one more particular example implementation of the present invention, a probability that the target text-string is misspelled is computed as a ratio of quantity of contexts including a correct spelling of the target text-string relative to the quantity of non-indeterminate contexts.

According to another general example embodiment of the present invention, a computer-implemented application detects spelling errors in a target text-string, such as a word or phrase. The target text-string is compared to a database of contexts to determine from the comparison, a set of contexts having an occurrence of the target text-string. By counting the quantity of each characterization, according to the present invention, the computer application computes a likelihood that the target text-string is misspelled. For example, with X being the quantity of contexts including a correct spelling of the target text-string, Y being the quantity of contexts including an incorrect spelling of a reference text-string, and Z being the quantity of indeterminate contexts, a likelihood that the target text-string is a misspelling of the reference text-string is computed as a function of X, relative to X plus Y. According to other more specific implementations of the present invention, the computation is a function of X, relative to X plus Y where each of X, Y and Z is a positive integer.

According to another important aspect of the present invention, heuristics are applied to characterize contexts, the heuristics being a function of the occurrences of the target text-string and the reference text-string in the context. Contexts are characterized as including an incorrect spelling of the reference text-string if occurrences of the reference text-string in the context are equal to or greater than a pre-determined minimum quantity threshold (e.g., 1), and a ratio of reference text-string occurrences in the context to target text-string occurrences in the context is also equal to or greater than a pre-determined ratio threshold. Contexts are characterized as including a correct spelling of the target text-string if occurrences of the target text-string in the context are equal to or greater than a second pre-determined quantity threshold (e.g., 1), and a ratio of target text-string occurrences in the context to reference text-string occurrences in the context is also equal to or greater than a second pre-determined ratio threshold. Contexts not characterizable as either correctly spelled or misspellings are classified or tagged "indeterminate."

According to another general example embodiment of the present invention, a computer-implemented search engine application detects spelling errors in a target text-string included within a received search query.

According to another general example embodiment of the present invention, spelling errors are detected in a target text-string by selecting a reference text-string having characteristics corresponding to the target text-string, computing a first ratio of occurrences of the reference text-string relative occurrences of the target text-string in a first database, computing a second ratio of occurrences of the reference text-string relative to occurrences of the target text-string in a second database, and determining a likelihood that the target text-string is misspelled as a function of the first ratio relative to the second ratio. The first and second databases are each a corpus including naturally occurring text that are similar in patterns of content to each other and the text being examined. However, the second database includes fewer spelling errors than the first database.

According to another general example embodiment of the present invention, a target text-string is compared to a database, or corpus, to determine a set of contexts which each include an occurrences of the target text-string. Each context of the set of contexts is further characterized, first using the corpus and second using a better-spelled corpus, as either including a correct spelling of the target text-string, including an incorrect spelling of a reference text-string (e.g., another word or phrase), or being a context including an indeterminate usage of the target text-string in the context. A first ratio is computed of occurrences of the reference text-string relative occurrences of the target text-string in the first database. A second ratio is computed of occurrences of the reference text-string relative to occurrences of the target text-string in the second database, and a likelihood that the target text-string is misspelled is determined as a function of the first ratio and the second ratio. According to a further aspect, the target text-string is received as a portion of a search query for a computer-implemented data network search engine.

According to another general example embodiment of the present invention, web page information is controlled in response to a user query identifying a first target web page. Each text-string of the user query is spell-checked. The resulting correctly-spelled search query identifies a second target web page. A database is searched to determine whether the second target web page corresponds to at least one destination web page. In response to the second target web page corresponding to said at least one destination web page, link information is presented for the user to access the destination web pages, along with peripheral information relevant for evaluating the link.

In another example embodiment, the present invention is direct to a process for estimating a probability that a random instance of a given text-string (e.g., word or phrase), "bad_word," is a misspelling of a reference text-string. The reference text-string, "good_word," is another phrase, word, or portion thereof. This probability is expressed in shorthand notation as: $p_{Misspell}$(bad_word, good_word). The bad_word is one text-string extracted from a text being examined for spelling errors. A large corpus of naturally occurring text is similar in patterns of content and misspelling to the text being examined. The method of the present invention does not require manual tagging or intervention of the corpus.

According to one aspect of the present invention, occurrences of bad_word in the corpus are broken up into a set of contexts. Contexts include at least one occurrence of bad_word and are defined based upon the words located adjacently or nearby the occurrence of bad_word. For each of these contexts, heuristics are applied to determine whether the collective occurrences of bad_word in the context include misspellings of good_word in the context, include correct spellings of bad_word in the context, or whether not enough information is available to distinguish between the correctness and incorrectness of bad_word (i.e., the context is indeterminate) in the context.

The probability, $p_{Misspell}$(bad_word, good_word), is estimated as the ratio of the number of instances of bad_word in contexts (of the set of contexts) characterized as including misspellings of good_word, to the total number of instances of bad_word in contexts (of the set of contexts) that were not characterized to be indeterminate (e.g., misspellings of good_word, or correct spellings of bad_word in the context). Alternatively, probability, $p_{Misspell}$(bad_word, good_word), is equivalently estimated as one minus the ratio of the number of instances of bad_word in contexts characterized as including correct spellings of bad_word, to the total number of instances of bad_word in contexts of the set of contexts that were not characterized to be indeterminate.

Occurrences of bad_word are determined to be misspellings of good_word in a given context by comparing of the number of occurrences of bad_word in the given context, $f_{bad}$, to the number of occurrences of good_word in the given context, $f_{good}$. If $f_{bad}$ is significant, and greater than $f_{good}$, the occurrences of bad_word in the given context are deemed to be correctly spelled occurrences of bad_word, and the given context is determined to include correct spellings of bad_word. If $f_{good}$ is significant, and greater than $f_{bad}$, the occurrences of bad_word in the given context are deemed to be misspellings, and the given context is determined to include misspellings of good_word. Those contexts including at least one occurrence of bad_word but not meeting the criteria for characterizing the context as including either correct spellings of bad_word or misspellings of good_word are characterized as being indeterminate. A variety of different heuristics, in addition to those detailed above, are contemplated by the method of the present invention.

According to one example implementation of the present invention, the number of occurrences of a word in a context is significant if it is at least meets a given threshold and the ratio of the frequency of the word in this context to the frequency of the word in the whole corpus is at least a second threshold. Thresholds of 3 and 30 have been found to be useful.

Other significance-determination implementations are contemplated within the scope of the present invention. In a further example implementation of significance determinations, comparison thresholds are determined dynamically according to pre-determined criteria.

According to another example embodiment of the present invention, a two corpus method of the present invention includes an dimension added to the method set forth above. The ratio of the frequencies (of occurrences) of good_word relative to bad_word (i.e., $f_{good}/f_{bad}$) in a given context are first determined from a corpus (e.g., a main corpus) as described above, which ratio shall hereafter be referred to as the "main corpus ratio". Another ratio of the frequencies (of occurrences) of good_word relative to bad_word (i.e., $f_{good}/f_{bad}$) in the given context are also determined from a second, better-spelled corpus, which ratio shall hereafter be referred to as the "better-spelled ratio". The better-spelled corpus is similar in patterns of content to the main corpus, but includes fewer words are misspelled in the second corpus than are misspelled in the main corpus. Contexts are determined as described above from either one of the corpora. Finally, the ratio of (1) the better-spelled ratio to (2) the main corpus ratio shall hereafter be referred to as the "better-to-main ratio".

The main corpus ratio in the given context, the better-spelled ratio, and the better-to-main ratio are then used to determine whether bad_word is likely misspelled. For example, if the main corpus ratio is greater than a given threshold (a threshold of one works well), if better-spelled ratio is greater than a given threshold (a threshold of two works well), and if the better-to-main ratio is greater than a given threshold (a threshold of two works well), bad_word is likely misspelled in the given context. If the better-spelled ratio is less than a given threshold (a threshold of one works well), bad_word is likely spelled correctly in the given context. Other thresholds, of course, may be used. Similarly, other comparisons of the main corpus ratio, the better-spelled ratio, and/or the better-to-main ratio may be used.

According to another example embodiment of the present invention, a two corpus method is applied without restriction to a context. For example, if the main corpus ratio is greater than a given threshold (such as one), if the better-spelled ratio is greater than a given threshold (such as two), and if the better-to-main ratio is greater than a given threshold (such as two), bad_word is likely misspelled in this context. If the better-spelled ratio is less than a given threshold (such as one) or if the better-to-main ratio is greater than a given threshold (such as 1.5), then bad_world is likely correct in the given context. Other thresholds, of course, may be used. Similarly, other comparisons of the main corpus ratio, the better-spelled ratio, and/or the better-to-main ratio may be used.

Related words are sometimes misidentified as misspellings in context-based determinations. According to another example embodiment of the present invention, these related word misidentifications are mitigated. If bad_word is truly a universal (i.e., not context sensitive) misspelling of good_word, bad_word is expected to occur in every context in which good_word frequently occurs. Discovery of at least one context in which good_word appears often, but bad_word occurs very seldom, indicates that bad_word may not really a universal misspelling of good_word applicable anywhere. For example, a context-based determination may conclude that "woman" is a misspelling of "women," based on frequencies of occurrence heuristics, such as those set forth above, in a significant portion of the same contexts. However, observing that the phrase "What Women Want" (a popular movie title) occurs frequently, but that "What Woman Want" almost never occurs, indicates that in certain contexts, "woman" is not a misspelling of "women." Therefore, "woman" is not a universal misspelling of "women" and the present example method concludes that the target text-string (i.e., "woman") is never really a misspelling of the reference text-string (i.e., "women") in any context. In an alternative implementation, discovery of at least N contexts in which good_word appears often, but bad_word occurs very seldom, is necessary to indicate that bad_word may not really a universal misspelling of good_word applicable anywhere, N being greater than one.

According to a further example embodiment of the present invention, the above-described two corpus, context insensitive method is used in combination with one of the context sensitive methodologies described previously, to supervise the determination of misspelling likelihood. For example, a likelihood that a target text-string is misspelled is computed unless at least N contexts are discovered in which the reference text-string appears often, but a target text-string occurs very seldom, indicating that the target text-string is not really a universal misspelling of the reference text-string.

Use of contexts in the example embodiments of the present invention for determining the likelihood (i.e., $p_{Misspell}$(bad_word, good_word)) that a target word is misspelled is distinguishable from the general use of n-gram contextual information in conventional statistical language model (SLM) based spelling correction methods. For example, other SLM-based spelling correction methods might correctly correct "collage cheerleaders" to "college cheerleaders" based on a frequency of "college cheerleaders" in a training corpus. However, the other SLM-based spelling correction methods typically may not be able to correct "collage" to "college" in isolation, or in a novel context (i.e., not a well-known context such as "college cheerleaders"). The method of the present invention is capable of determining that "collage" is usually a misspelling of "college" by determining a likelihood of a "universal" misspelling derived from a variety of contexts, and ensuring the likelihood determination is accurate through application of significance determinations.

According to a further example embodiment of the present invention, the above-described example embodiments are used to compute a likelihood (e.g., probability) that a target text-string is a misspelling of a reference text-string. The probability is thereafter used in a reverse manner to select or suggest the reference text-string as a potential spelling correction for the target text-string to the user. In one example implementation, the user is presented with a ranked list of alternative reference text-strings from which a selection may be made for substitution with the target text-string being examined.

According to a further example embodiment of the present invention, the above-described methods are implemented in a data network search engine application to check the spelling of text used to direct a search of the data network. For example, an Internet search engine includes spell-checking steps, such as those outlined above. The search engine prompts a user for a search query, the query being a series of text-strings identifying a first target web page. The text-strings of the search query are subjected to a spell-check examination. In one implementation, the user is prompted to confirm or correct text-strings identified as likely misspelled. In another implementation, spelling errors are automatically corrected using a reference text-string having a significantly large likelihood of being a misspelling. The search query resulting following the spell-checking procedures identifies a second target web page. The search engine subsequently conducts a search of the data network for at least one destination web page based upon the spell-corrected search query identifying the second target web page.

FIG. 1 illustrates an one example of a computer system 100 implementing a spell-checking function of the present invention. A user's computer 110 is coupled to a data network (e.g., the Internet) 180 via a communication interface 115. Web page servers, 120, 130 and 140 respectively are also coupled to data network 180, each being adapted to serve web pages (e.g., hyperlinked documents) and other information through the data network. For example, server 120 hosts web pages 125, server 130 hosts web pages 135, and server 140 hosts web pages 145. A browser application executing on user computer 110 facilitates retrieval of data network information, web pages for example.

Computing apparatus 150 is coupled to the data network. Computer 150 includes a storage media 160 coupled to a processor 170. Storage media 160 stores at least one database 165, the database being a spell-checking corpus, for example. In one example arrangement, computer 150 executes, through processor 170, a data network search engine application. The search engine application is adapted to search the data network for destination web pages in response to a search query. Searching the data network includes searching a web page summary database stored in storage media, the database including descriptive and linking information characterizing each of web pages 120, 130, and 140 respectively.

A user submits a search query through user computer 110, the communication interface 115 and data network 180 to the search engine application running on computer 150. The search query identifies a first target web page. First target web page corresponds to web page 120, for example. However, the search query may contain spelling errors in the text of the search query that misidentifies a user-intended destination web page, for example the user may be attempting to retrieve web page 140 through their search. The search engine application includes a spell-checking method, for example as described herein, which is used to spell-check text of the received search query. The post-spell-checked search query identifies a second target web page, for example, second target web page corresponds to user-intended destination web page 140. It is possible for second target web page to be different than first target web page if significant changes are made to text terms of the search query as a result of the spelling error detection process. Alternatively, second target web page may not be different than first target web page if no, or insignificant, changes are made to the search query as a result of the spelling error detection process. The search engine executes a search of the data network, and/or the summary database, responsive to the spell-checked search query to determine whether the identified second target web page corresponds to at least one destination web page, web page 140 for example. Thereafter, the search engine presents link and descriptive web page summary information to the user based upon search results.

Figure 2:
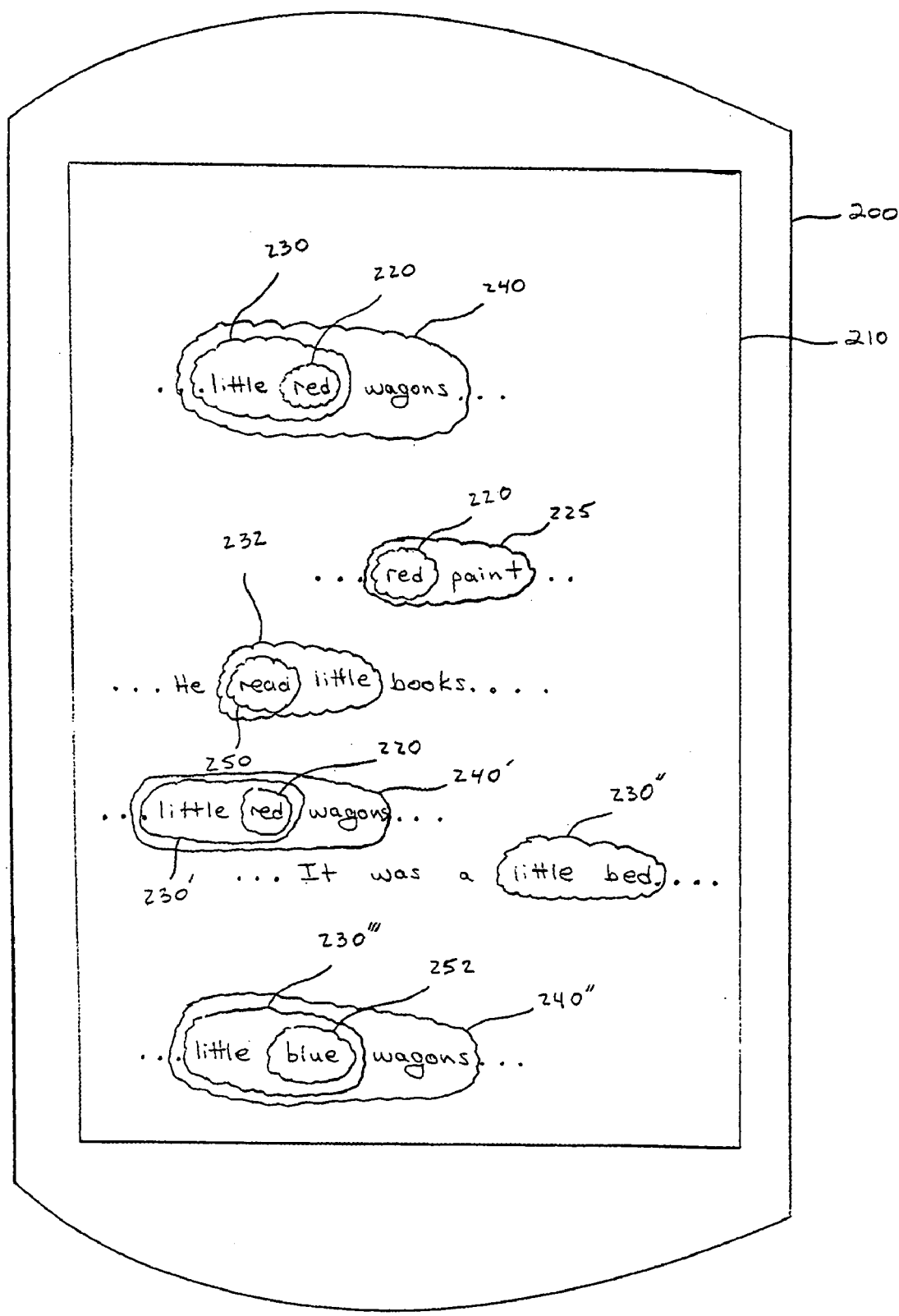
FIG. 2 illustrates an example embodiment of a corpus database, according to an example embodiment of the present invention While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

FIG. 2 illustrates one example embodiment of a corpus of the present invention. A database (e.g., a corpus) 210 is stored in a storage media 200. FIG. 2 shows excerpts of text included in the corpus. From the text, various contexts are determinable based upon a target text-string (e.g., a word). One example of a target text-string 220 is the word "red." The corpus may include one or more occurrences of target text-string 220 as is shown in FIG. 2. Contexts of the target text-string are determined from occurrences of the target text-string in the corpus. For example, a first context 230 is derived from the target word following the word "little." The context is a text-string following the word "little." Other examples of the context are illustrated in FIG. 2 at 230' (another occurrence of the target word "red" following the word "little"), 230' (the same context although the word "little" is followed by a different word, "bed"), and 230''' (the word "little" followed by a word, "blue"). Alternatively, the context is definable as a text-string being within 1 word of the word "little," which would also include the word arrangement indicated at 232 where a word 250, "read," precedes the word "little," in addition to the context examples indicated at 230, 230', 230', and 230''' previously discussed.

Also derived from an occurrence of the target word "red" in the corpus, a second context 225 defined as a word preceding the word "paint." A third context 240 is also definable, context 240 being the target word situated between the words, "little" and "wagons." While no other examples of the second context 225 are illustrated in FIG. 2, two other examples of the third context 240 are illustrated, including 240' (another occurrence of the target word "red" situated between "little" and "wagons") and 240' (a different word 252, "blue," but situated between "little" and "wagons"). Words "read" 250, and "blue" 252 are illustrations of reference text-strings (e.g., words). Reference text-strings are other text-strings that occur in contexts identified from occurrences of the target text-string. According to the method of the present invention, heuristics are used to determine whether the target text-string is a misspelling of reference text-strings identified from contexts of the target text-string.

Accordingly, the present invention is not to be necessarily limited to the particular examples described above, but is intended to cover all aspects of the invention as fairly set out in the attached claims. For instance, while a method for spell-checking words of a search query of a data network search engine application is illustrated, other techniques for spell-checking text-strings in computer-implemented applications can benefit from the above mentioned teachings. Various modifications, equivalent processes, as well as numerous structures to which the present invention may be applicable will be readily apparent to those of skill in the art to which the present invention is directed upon review of the present specification. The claims are intended to cover such modifications and devices.

The invention claimed is:

1. A computer-implemented method for detecting spelling errors in a target text-string, comprising:
   comparing the target text-string to a database of contexts and determining from the comparison, a set of contexts characterized as
   X contexts, where each of the X contexts are characterized as including a correct spelling of the target text-string, and
   Y contexts, where each of the Y contexts are characterized as including an incorrect spelling of a reference text-string; and
   computing a likelihood that the target text-string is a misspelling of the reference text-string as a function of one of X or Y, relative to a combination of X and Y;
   characterizing a context as including an incorrect spelling of the reference text-string in response to occurrences of the reference text-string in the context being at least equal to a pre-determined minimum quantity threshold, and a ratio of reference text-string occurrences in the context to target text-string occurrences in the context being greater than a pre-determined ratio threshold.

2. The method of claim 1, wherein the likelihood that the target text-string is a misspelling of the reference text-string is computed as a function of X, relative to X plus Y.

3. The method of claim 1, further comprising applying heuristics to characterize a context of the database, the heuristics being a function of occurrences of the target text-string in the context and occurrences of the reference text-string in the context.

4. The method of claim 1, wherein the pre-determined ratio threshold is at least equal to 1.

5. The method of claim 4, wherein the pre-determined quantity threshold is 3, and the pre-determined ratio threshold is 1.

6. The method of claim 1, wherein no contexts simultaneously have occurrences of the reference text-string at least equal to a pre-determined maximum quantity threshold, and occurrences of the target text-string at most equal to a pre-determined minimum quantity threshold.

7. The method of claim 6, wherein the pre-determined maximum quantity threshold is 3, and the pre-determined minimum quantity threshold is 1.

8. The method of claim 1, further comprising:
   characterizing a context as including a correct spelling of the target text-string in response to occurrences of the target text-string in the context being at least equal to a second pre-determined quantity threshold, and a ratio of target text-string occurrences in the context to reference text-string occurrences in the context being greater than a second pre-determined ratio threshold.

9. The method of claim 8, wherein the second pre-determined ratio threshold is at least equal to 1.

10. The method of claim 9, wherein the second pre-determined quantity threshold is 3, and the second pre-determined ratio threshold is 1.

11. The method of claim 10, further comprising characterizing a context having an occurrence of the target text-string as indeterminate in response to the context not being characterizable as one of: including a correct spelling of the target text-string, or including an incorrect spelling of the reference text-string.

12. The method of claim 1, further comprising:
characterizing a context as having a correct spelling of the target text-string in response to occurrences of the target text-string in the context being at least equal to a pre-determined quantity threshold, and a ratio of target text-string occurrences in the context to reference text-string occurrences in the context being greater than a pre-determined ratio threshold.

13. The method of claim 12, wherein the pre-determined ratio threshold is at least equal to 1.

14. The method of claim 13, wherein the pre-determined quantity threshold is 3, and the pre-determined ratio threshold is 1.

15. The method of claim 1, wherein the target text-string is a word and the reference text-string is a word.

16. The method of claim 1, wherein the target text-string is a phrase, and the reference text-string is a phrase.

17. The method of claim 1, further comprising receiving a search query, the search query including the target text-string.

18. The method of claim 17, wherein the database is a corpus including naturally occurring text that is similar in patterns of content and misspelling to the search query.

19. The method of claim 1, wherein the database is a corpus including naturally occurring text that is similar in patterns of content and misspelling to a search query.

20. The method of claim 1, wherein the set of contexts may be characterized to include Z contexts, where each of the Z contexts are characterized as an indeterminate context.

21. The method of claim 20, wherein each of X, Y and Z is a positive integer.

22. A computer-implemented method for detecting spelling errors in a target text-string, comprising:
selecting a reference text-string having characteristics corresponding to the target text-string;
computing from a first database, a first ratio of occurrences of the reference text-string relative to occurrences of the target text-string;
computing from a second database, a second ratio of occurrences of the reference text-string relative to occurrences of the target text-string; and
determining a likelihood that the target text-string is misspelled as a function of the first ratio and the second ratio, wherein the first and second databases are each a corpus including naturally occurring text that are similar in patterns of content, the second database being a better-spelled corpus than the first database;
wherein the characteristics corresponding to the target text-string include an edit distance between the target text-string and the reference text-string, and an edit distance between the target text-string and any previously identified misspellings of the reference text-string, and wherein the target text-string is misspelled when the second ratio is greater than a first comparison threshold, and the ratio of the second ratio to the first ratio is greater than a second comparison threshold.

23. The method of claim 22, wherein the characteristics corresponding to the target text-string include the an edit distance between the target text string and the reference text string, and an edit distance between the target text string and any previously identified misspellings of the reference text string.

24. The method of claim 22, wherein the target text-string is misspelled when the second ratio is greater than a first comparison threshold, and the ratio of the second ratio to the first ratio is greater than a second comparison threshold.

25. The method of claim 24, wherein the first comparison threshold is 2 and the second comparison threshold is 2.

26. The method of claim 22, further comprising receiving a search query, the search query including the target text-string.

27. A computer-implemented method for detecting spelling errors in a target text-string, comprising:
comparing the target text-string to a first and second database of contexts and determining from the comparisons, a set of contexts including contexts characterized as
X contexts, each of the X contexts characterized as including a correct spelling of the target text-string,
Y contexts, each of the Y contexts characterized as including an incorrect spelling of a reference text-string, and
Z contexts, each of the Z contexts characterized as an indeterminate context; and
computing a likelihood that the target text-string is a misspelling of the reference text-string as a function of one of X and Y, relative to X plus Y;
wherein a context is characterized as including an incorrect spelling of the reference text-string or characterized as including a correct spelling of the target text-string in response to (1) a first ratio, determined from the first database, of occurrences of the reference text-string in the context to occurrences of the target text-string in the context, (2) a second ratio determined from the second database, of occurrences of the reference text-string in the context to occurrences of the target text-string in the context, and (3) a third ratio of the second ratio to the first ratio, the first and second databases each being a corpus including naturally occurring text that are similar in patterns of content, the second database being a better-spelled corpus than the first database.

28. The method of claim 27 wherein a context is characterized as including a misspelling if the first ratio is greater than a first predetermined comparison threshold, the second ratio is greater than a second comparison threshold, and the third ratio is greater than a third predetermined comparison threshold.

29. The method of claim 28 where the comparison thresholds are 1, 2, and 2 respectively.

30. The method of claim 27 wherein a context is characterized as including a correct spelling of the target text-string when the second ratio is less than a predetermined comparison threshold.

31. The method of claim 30 where the predetermined comparison threshold is 1.

32. The method of claim 27, further comprising receiving a search query, the search query including the target text-string.

* * * * *